US006614608B1

United States Patent
Belser et al.

(10) Patent No.: US 6,614,608 B1
(45) Date of Patent: Sep. 2, 2003

(54) BURIED SERVO PATTERNED MEDIA

(75) Inventors: Karl A. Belser, San Jose, CA (US); Alexei H. Sacks, Edina, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/496,621

(22) Filed: Feb. 2, 2000

Related U.S. Application Data
(60) Provisional application No. 60/121,140, filed on Feb. 22, 1999.

(51) Int. Cl.[7] .................................................. G11B 5/09
(52) U.S. Cl. ...................... 360/48; 360/135; 360/77.08; 360/78.14
(58) Field of Search .................... 428/694 RT, 694 TM; 360/48, 75, 135, 73.03, 77.08, 78.14, 77.07, 77.03, 78.11

(56) References Cited

U.S. PATENT DOCUMENTS

| | | |
|---|---|---|
| 3,869,711 A | 3/1975 | Bernard et al. |
| 3,956,769 A | 5/1976 | Beecroft et al. |
| 4,006,292 A | 2/1977 | Schaefer |
| 4,318,141 A | 3/1982 | Haynes |
| 4,581,663 A | 4/1986 | Tanaka |
| 4,639,906 A | 1/1987 | Goto |
| 4,737,877 A | 4/1988 | Krongelb et al. |
| 4,802,050 A | 1/1989 | Miyabayashi et al. |
| 4,805,065 A | 2/1989 | Jagannathan et al. |
| 4,912,585 A | 3/1990 | Belser et al. |
| 4,935,278 A | 6/1990 | Krounbi et al. |
| 4,935,835 A | 6/1990 | Godwin et al. |
| 4,961,123 A | 10/1990 | Williams et al. |
| 5,055,951 A | 10/1991 | Behr |
| 5,070,421 A | 12/1991 | Sumiya et al. |
| 5,083,226 A | 1/1992 | Shiiki et al. |
| 5,119,248 A | 6/1992 | Bizjak et al. |
| 5,296,995 A | 3/1994 | Yonezawa et al. |
| 5,325,244 A | 6/1994 | Takano |
| 5,537,282 A | 7/1996 | Treves et al. |
| 5,568,331 A | 10/1996 | Akagi et al. |
| 5,583,727 A | * 12/1996 | Parkin .......................... 360/55 |
| 5,703,733 A | 12/1997 | Suzuki et al. |

OTHER PUBLICATIONS

Y. Ohtsuka et al., "A New Magnetic Disk with Servo Pattern Embedded under Recording Layer", IEEE Transactions on Magnetics, vol. 33, No. 5, Sep. 1997, pp. 2620–2622.

\* cited by examiner

*Primary Examiner*—Alan T. Faber
(74) *Attorney, Agent, or Firm*—Westman, Champlin & Kelly, P.A.

(57) ABSTRACT

A data storage system includes a data storage disc for storing magnetically encoded data and servo information. The data storage disc includes a data layer adapted to be magnetically encoded with data to be written to the data storage disc, and a servo information layer formed beneath the data layer and having magnetic servo pits formed therein to provide servo information. The magnetic servo pits are positioned in portions of the servo information layer which are at least partially directly beneath magnetically encoded data regions on the data layer such that a data head can read both magnetically stored data and servo information from the disc at substantially the same time. A method of fabricating a magnetic data disc is also disclosed.

20 Claims, 11 Drawing Sheets

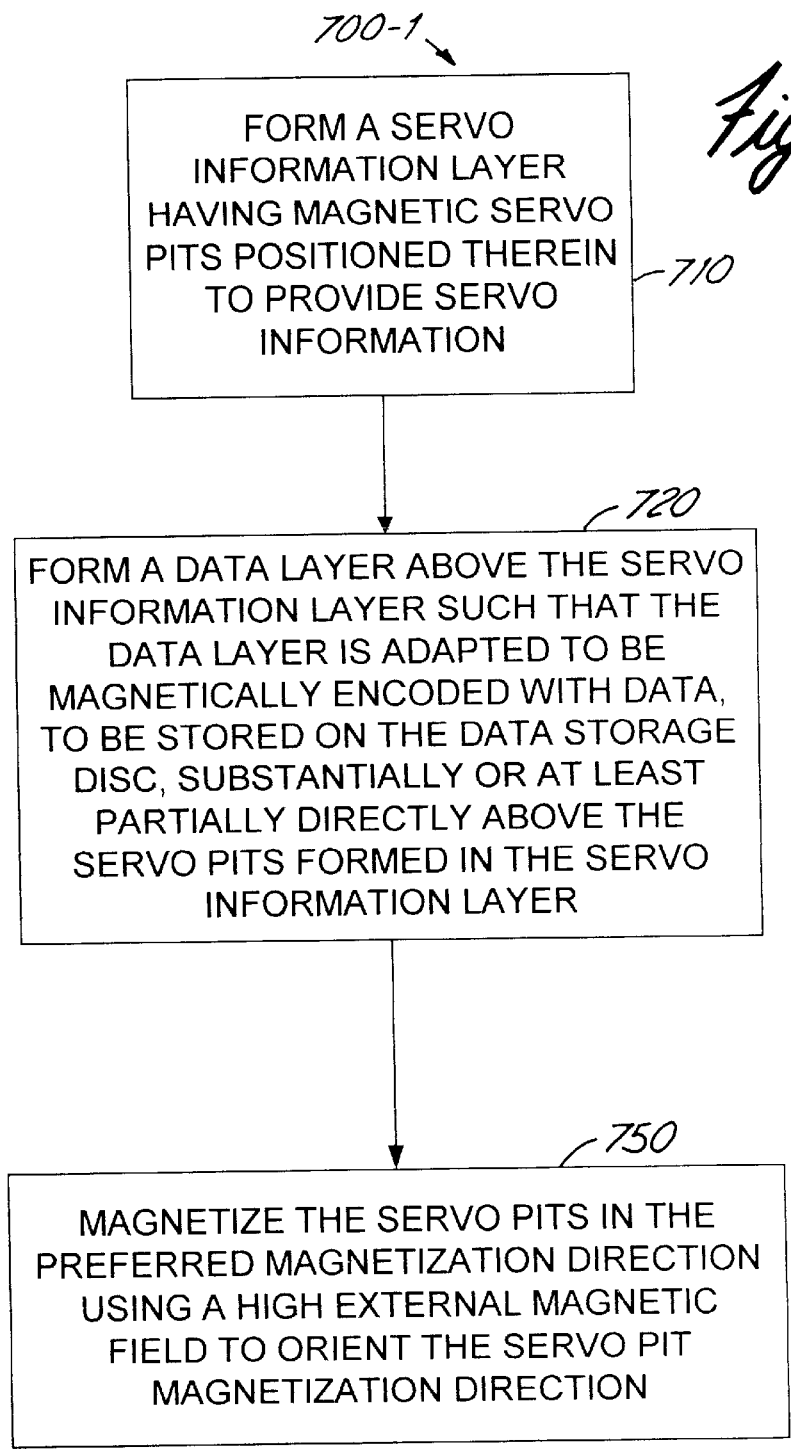

p := 10   Period of buried pattern in um
s := 2.5  Spacing below surface in um
A := 1    Amplitude of square wave at pattern

*Fig. 11*

| Spacing Layer Loss Equation | Signal Spacing Loss | 3rd Harmonic Spacing Loss |

$$L(d,p) := e^{-2\pi \frac{d}{p}} \qquad L\left(s, \frac{p}{1}\right) = 0.208 \qquad L\left(s, \frac{p}{3}\right) = 8.983 \cdot 10^{-3}$$

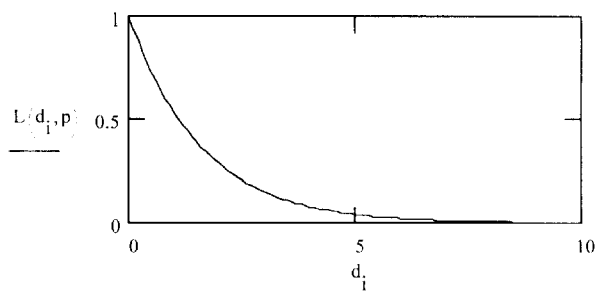

$$\text{Pattern}(x) := \frac{4 \cdot A}{\pi} \cdot \left[\sin\left(2\pi \frac{x}{p}\right) + \frac{\sin\left(2 \cdot 3 \cdot \pi \frac{x}{p}\right)}{3} + \frac{\sin\left(2 \cdot 5 \cdot \pi \frac{x}{p}\right)}{5} + \frac{\sin\left(2 \cdot 7 \cdot \pi \frac{x}{p}\right)}{7}\right]$$

$$\text{Signal}(x) := \frac{4 \cdot A}{\pi} \cdot \left[L\left(s, \frac{p}{1}\right) \cdot \sin\left(2\pi \frac{x}{p}\right) + L\left(s, \frac{p}{3}\right) \cdot \frac{\sin\left(2 \cdot 3 \cdot \pi \frac{x}{p}\right)}{3} + L\left(s, \frac{p}{5}\right) \cdot \frac{\sin\left(2 \cdot 5 \cdot \pi \frac{x}{p}\right)}{5}\right]$$

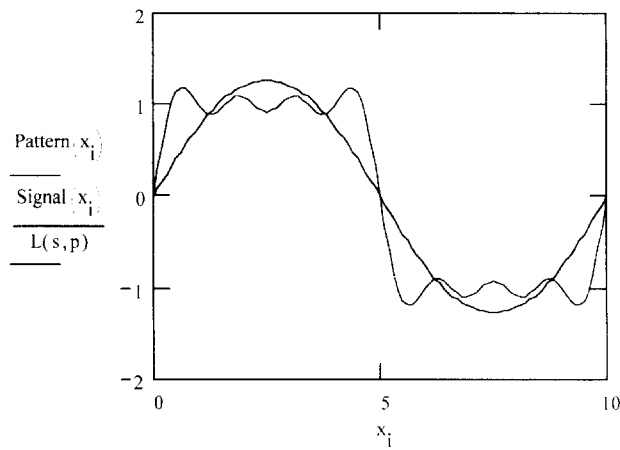

BURIED SERVO PATTERNED MEDIA

CROSS-REFERENCE TO CO-PENDING APPLICATION

This application claims the benefit of U.S. Provisional Patent Application No. 60/121,140, which is entitled "BURIED SERVO PATTERNED MEDIA" and was filed on Feb. 22, 1999.

Cross-reference is made to U.S. patent application Ser. No. 09/152,356, filed on Sep. 14, 1998 and entitled "TRACK POSITION ID INFORMATION"; to U.S. patent application Ser. No. 09/425,576, filed Oct. 22,1999 and entitled "METHOD AND APPARATUS FOR ENCODING IDENTIFICATION INFORMATION ON A MAGNETIC DISC"; to patent application U.S. Ser. No. 09/209,902, filed on Dec. 11, 1998 and entitled "PHOTO SERVO PATTERNING ON MAGNETO-OPTICAL MEDIA"; and to U.S. patent application Ser. No. 09/130,657, filed Aug. 7, 1998 and entitled "HARD DISC PATTERNING", which are assigned to the same Assignee.

FIELD OF THE INVENTION

The present invention relates to data storage devices and, in particular, to a method of encoding servo information on discs and hard disc drives manufactured using the same.

BACKGROUND OF THE INVENTION

A typical disc drive storage system includes one or more magnetic discs which are mounted for co-rotation on a hub or spindle. A typical disc drive also includes a transducer supported by a hydrodynamic bearing which flies above each magnetic disc. The transducer and the hydrodynamic bearing are collectively referred to as a data head. A drive controller is conventionally used for controlling the disc drive based on commands received from a host system. The drive controller controls the disc drive to retrieve information from the magnetic discs and to store information on the magnetic discs. An electromechanical actuator operates within a negative feedback, closed-loop servo system to move the data head radially or linearly over the disc surface for track seek operations and holds the transducer directly above a desired track or cylinder on the disc surface for track following operations.

Information is typically stored in concentric tracks on the surface of the magnetic discs by providing a write signal to the data head to encode flux reversals on the surface of the magnetic discs representing the data to be stored. In retrieving data from the discs, the drive controller controls the electromechanical actuator so that the data head flies above the desired track or cylinder on the magnetic discs, sensing the flux reversals on the magnetic discs, and generating a read signal based on those flux reversals.

In an embedded servo-type system, servo information (for example in the form of servo bursts) is recorded on data tracks which also contain stored data. The servo bursts are typically temporally spaced evenly about the circumference of each data track. Data is recorded on the data tracks between the servo bursts. In a dedicated servo-type system, an entire disc surface in a disc drive is dedicated to storing the servo information, while other disc surfaces are used for data storage.

As the data head reads the servo information, the transducer provides a position signal which is decoded by a position demodulator and presented in digital form to a servo control processor. The servo control processor essentially compares actual radial position of the transducer over the disc (as indicated by the embedded servo burst) with a desired position and commands the actuator to move in order to minimize position error.

Often, the servo information is prerecorded on the disc surfaces during manufacture of the disc drive module using a process sometimes referred to as servo writing. Each disc drive module is mounted to a servo writer support assembly which precisely locates the disc surfaces relative to a reference or origin. The servo writer support assembly supports a position sensor, such as laser light interferometer, which detects the position of the actuator relative to the disc surfaces. The position sensor is electrically inserted within the disc drive's negative feedback, closed-loop servo system for providing position information to the servo system while the servo data is being written to the disc surfaces. The servo writer support assembly may also support a clock writer transducer which writes a clock pattern onto the disc surface which is used for temporally spacing the servo data about the circumference of each track.

Using a servo writer support assembly to write servo information typically requires many minutes for each disc assembly. Such time slows manufacturing throughput and potentially increases the cost of the finished product. Another limitation is that the servo written patterns generally consume about 5–10% of the usable recording area in a given disc drive.

Another technique for writing servo information uses the disc drive itself to write the servo information in situ. In Situ recording means that the servo patterns are recorded on a fully assembled drive using the product head. An example of this technique is set forth in U.S. Pat. No. 5,875,064, to Chainer et al. However, one limitation that has generally limited self-servowriting techniques is that disturbances inherent in the drive itself, such as disc flutter and spindle non-repeatable runout (NRRO), limit the radial and circumferential accuracy of the position sensing pattern. As a result, the limits of pure in situ techniques are not known.

Buried magnetic recording has been considered in hard disc systems to increase the usable recording area on the disc surfaces. See, for example, U.S. Pat. Nos. 5,055,951 and 4,318,141. These techniques use thick magnetic media and a magnetic recording head to write servo information deep into the data storage layer. The data signal is then written into the shallow part of the data storage layer without completely erasing the servo information which has been recorded deeper into the layer. This partial penetration magnetic recording introduces the potential to compromise the user data.

As industry continues to press disc drive manufacturers to provide disc drives with increased storage capacity at lower costs, it is becoming increasingly important to provide disc drives with increasing track densities while minimizing manufacturing time and labor costs.

The present invention addresses these and other problems, and offers other advantages over the prior art.

SUMMARY OF THE INVENTION

The present invention relates to data storage systems having magnetic servo information and magnetically stored data on the same disc which solves the above-mentioned problems.

A data storage system includes a data storage disc for storing magnetically encoded data and servo information. The data storage disc includes a data layer adapted to be magnetically encoded with data to be written to the data storage disc, and a servo information layer formed beneath the data layer and having magnetic servo pits formed therein to provide servo information. The magnetic servo pits are positioned in portions of the servo information layer which are at least partially directly beneath magnetically encoded data regions on the data layer such that a data head can read both magnetically stored data and servo information from the disc at substantially the same time.

The invention also includes a method of manufacturing a data storage disc having servo pits in a servo information layer directly beneath magnetically encoded data stored on a data layer.

These and various other features as well as advantages which characterize the present invention will be apparent upon reading of the following detailed description and review of the associated drawings.

BRIEF DESCRIPTION OF THE DRAWINGS

FIG. 6–1 is a plot of a continuous servo signal.

FIG. 6–2 is a diagrammatic illustration of an embodiment of the present invention at an inner diameter region of the disc.

FIG. 6–3 is a diagrammatic illustration of an embodiment of the present invention at an outer diameter region of the disc.

FIGS. 7–9 are flow diagrams illustrating embodiments of a method of fabricating magnetic discs in accordance with the invention.

FIG. 11 is equations and plots illustrating various aspects of the invention.

DETAILED DESCRIPTION OF ILLUSTRATIVE EMBODIMENTS

Figure 1:
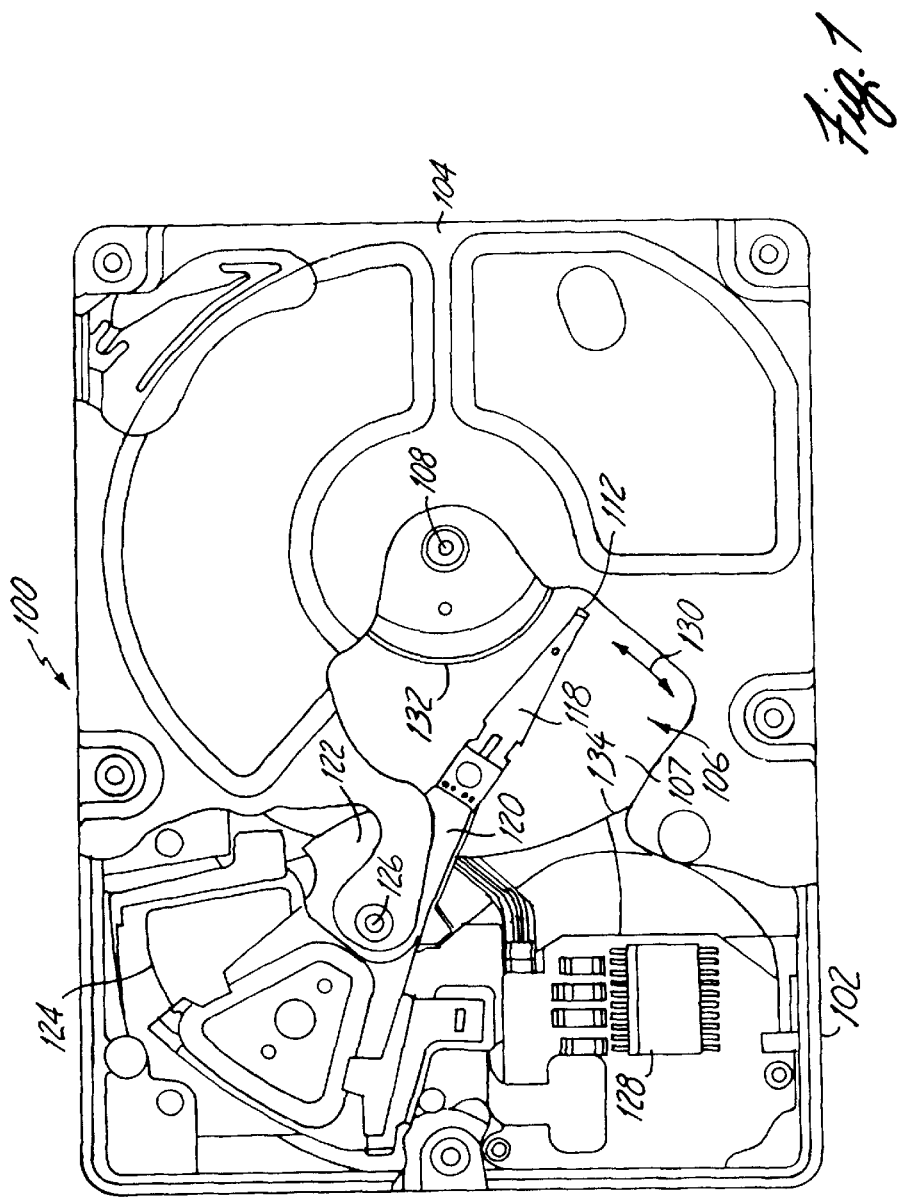
FIG. 1 is a perspective view of a head disc assembly (HDA) with which the present invention is useful.

FIG. 1 is a plan view of a disc drive 100 which includes a housing with a base 102 and top cover 104 (sections of top cover 104 are removed for clarity). Disc drive 100 further includes a disc pack 106 which is mounted on a spindle motor (not shown). Disc pack 106 includes a plurality of individual discs 107 which are mounted for co-rotation about central axis 108. Each disc 107 has an associated head 112 which carries one or more read and write transducers for communicating with the disc surface. Each head 112 is supported by a suspension 118 which is in turn attached to a track accessing arm 120 of an actuator assembly 122.

Actuator assembly 122 is rotated about a shaft 126 by a voice coil motor 124, which is controlled by servo control circuitry within internal circuit 128, to move head 112 in an arcuate path 130 between a disc inner diameter 132 and a disc outer diameter 134. In accordance with embodiments of the invention, magnetic servo information is hard patterned into the substrate, or into a servo information layer formed thereon, on one or more disc surfaces of disc pack 106. Data is recorded in data tracks of a magnetic data layer formed on top of (with one or more additional layers between if desired) the hard patterned magnetic servo information layer. Using this feature of the present invention, servo information can be placed in areas which will be directly under data stored in the magnetic data layer, thus providing a continuous servo signal to the head. At the same time, portions of the usable recording area of the magnetic data layer which are typically used for servo information can be used to store data if desired.

As actuator assembly 122 positions head 112 over a desired data track, the read transducer in head 112 reads the stored information from the disc surface. The servo control circuitry within internal circuit 128 compares the recovered, hard patterned servo information with a desired radial position for head 112 and commands actuator assembly 122 to move in order to minimize position error.

Figure 2:
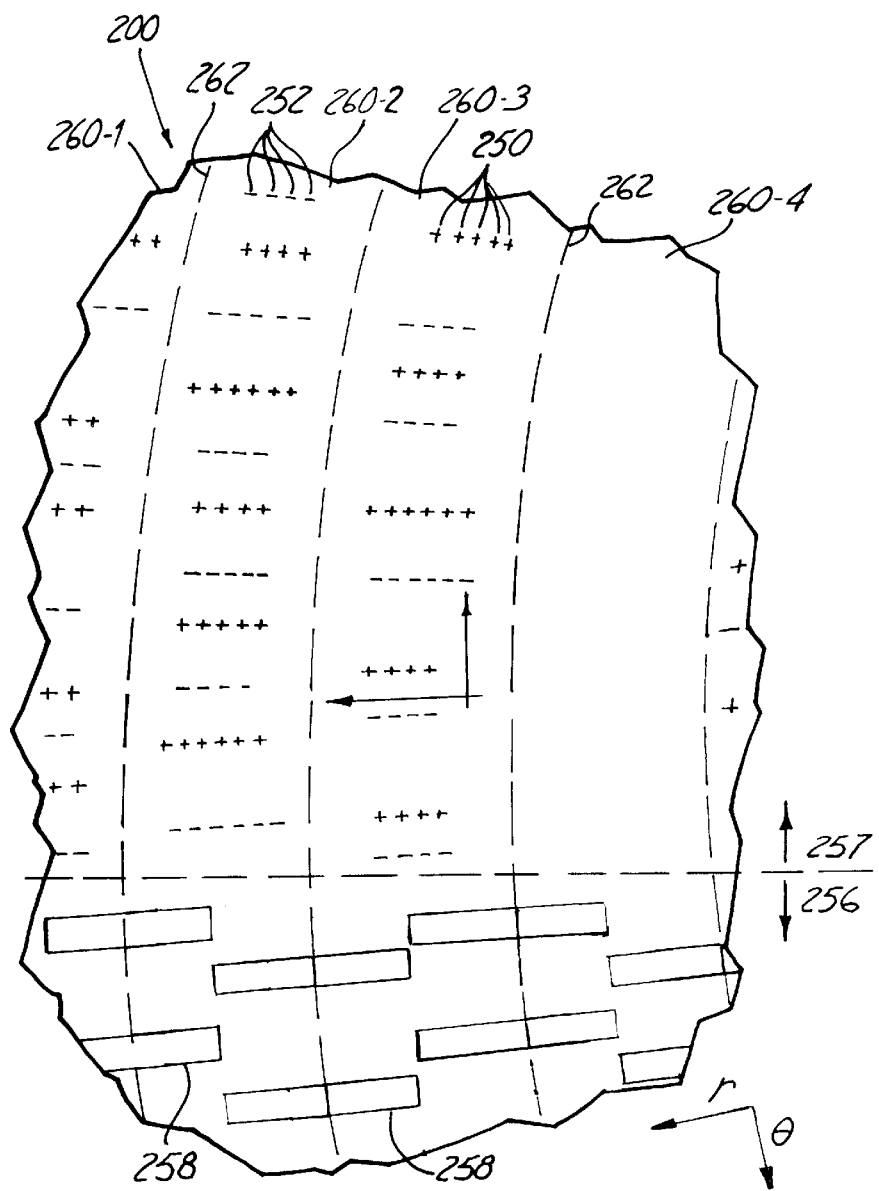
FIG. 2 is a greatly enlarged top plan view of a portion of a prior art thin film magnetic disc, diagrammatically showing magnetic flux corresponding to data and servo information stored on the magnetic disc.
Figure 3:
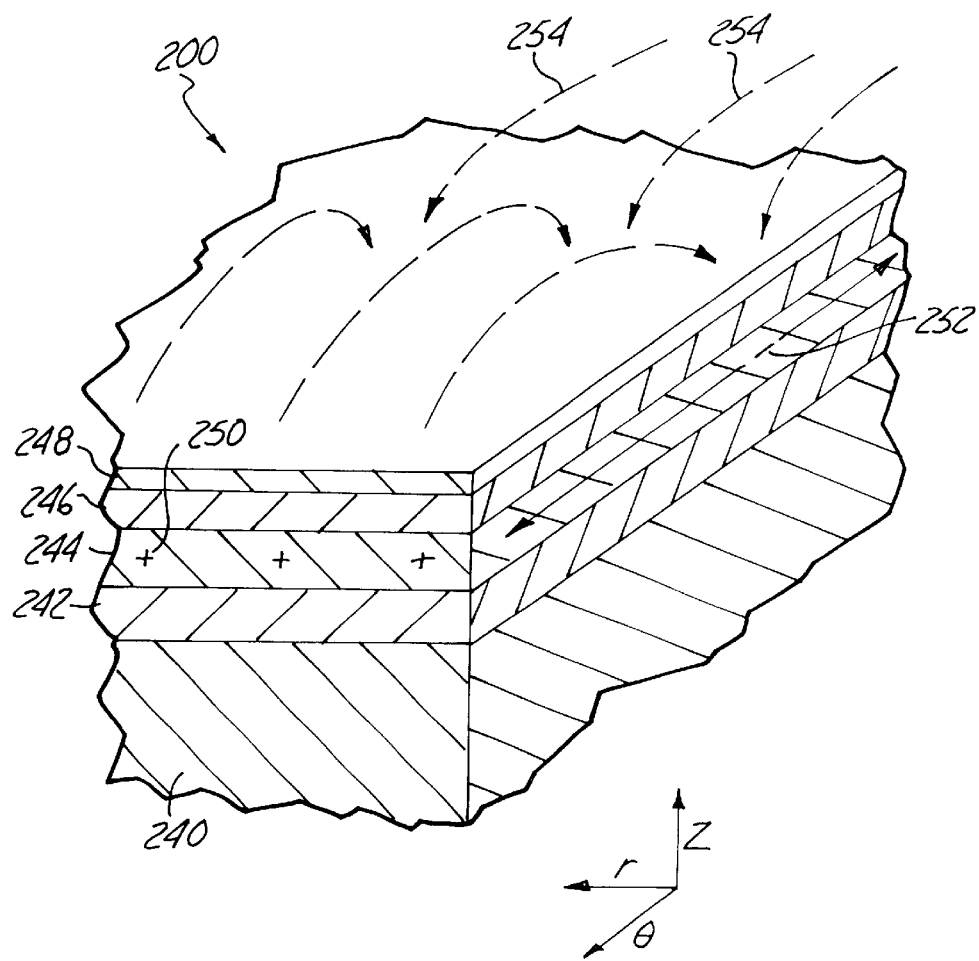
FIG. 3 is a cross-sectional perspective view of a portion of the prior art thin film magnetic disc of FIG. 2 taken along line 4—4.

A prior art magnetic medium 200 for a disc is illustrated in more detail in FIGS. 2 and 3. Magnetic medium 200 is described in U.S. Pat. No. 5,858,474. Magnetic medium 200 has a substrate 240 and an underlayer 242 deposited over the substrate 240. Substrate 240 can be a nickel-phosphorous plated aluminum disc. Substrate 240 provides the structural integrity for magnetic medium 200. Other materials, such as glass or manganese-oxide, may also be suitable for substrate 240.

Underlayer 242 can be formed of a relatively non-magnetic material, such as chromium or nickel-phosphorus. Underlayer 242 sets up a seeding crystallographic structure for proper crystal development in magnetic data layer 244. Underlayer 242 may be applied over substrate 240 by sputtering, and various sputter chamber parameters may contribute to the effectiveness of underlayer 242. Magnetic data layer 244 of a magnetic material is applied over underlayer 242. Magnetic data layer 244 can be formed of a cobalt-based alloy, such as a cobalt-chromium-tantalum alloy. The cobalt-based magnetic data layer 244 can have an HCP crystal structure. Magnetic data layer 244 can be applied over underlayer 242 by sputtering, and various sputter chamber parameters may contribute to the effectiveness of magnetic data layer 244.

Overcoat 246 can be deposited over magnetic data layer 244. Overcoat 246 enhances the durability and wear resistance of the magnetic media 200. A lubricant layer 248 overlies overcoat 246. Lubricant layer 248 further reduces wear of the magnetic media 200 due to contact with the head. Overcoat 246 and lubricant 248, while not performing a magnetic function, greatly affect the tribology, wear and corrosion in the disc drive system 10.

Prior art magnetic medium 200, as constructed, can be homogeneous in the radial direction r and the circumferential direction θ. After construction, data is magnetically recorded on magnetic data layer 244 of medium 200, as represented in FIGS. 2 and 3 by + and − magnetization signs 250, 252, respectively, together with magnetic flux arrows 254.

During manufacture of a disc drive utilizing prior art magnetic medium 200, servo patterns 256 (shown in FIG. 2) are magnetically written on magnetic data layer 244 of medium 200. Servo patterns 256 include servo information 258 (for example in the form of servo bursts) which is precisely located on magnetic medium 200 both in the radial and circumferential directions. Servo patterns 256 define the radial location of concentric tracks 260-1, 260-2, 260-3, 260-4, which are shown separated by imaginary track boundaries 262. Servo patterns 256 contain indexing information to index each track 260 of the disc. Servo patterns 256 also contain centering information to center the magnetic head with respect to a particular track 260. The indexing and centering information of servo patterns 256 is used by the disc drive to precisely position the magnetic head in the radial direction with respect to the disc.

Although servo information 258 is diagrammatically illustrated using rectangular symbols, it will be understood by those of skill in the art that servo data can be written or formed in a manner which is the same or similar to the manner in which data is written to the disc. The method of illustrating servo information 258 in FIGS. 2 and 3 does not limit the type of servo information on the disc. For example, a different servo pattern is a null pattern, and such a pattern could be used instead.

Figure 4:
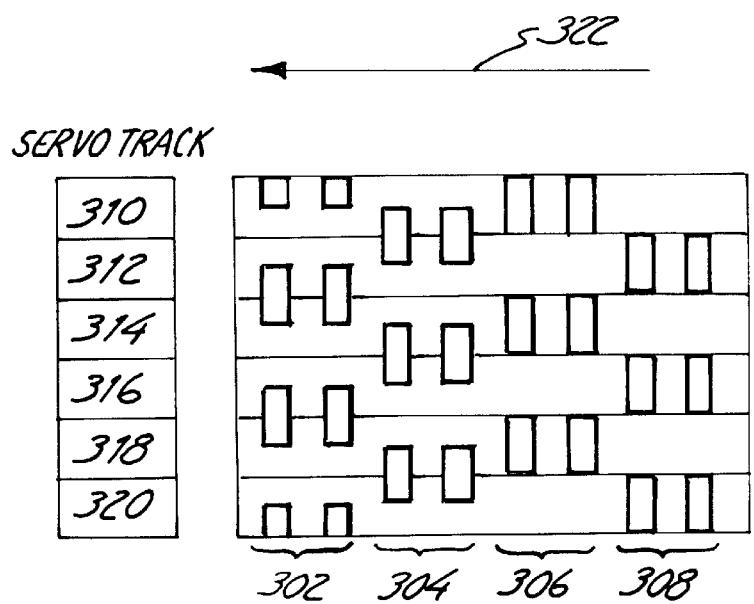
FIG. 4 is a diagrammatic illustration of a prior art servo data pattern.
Figure 5:
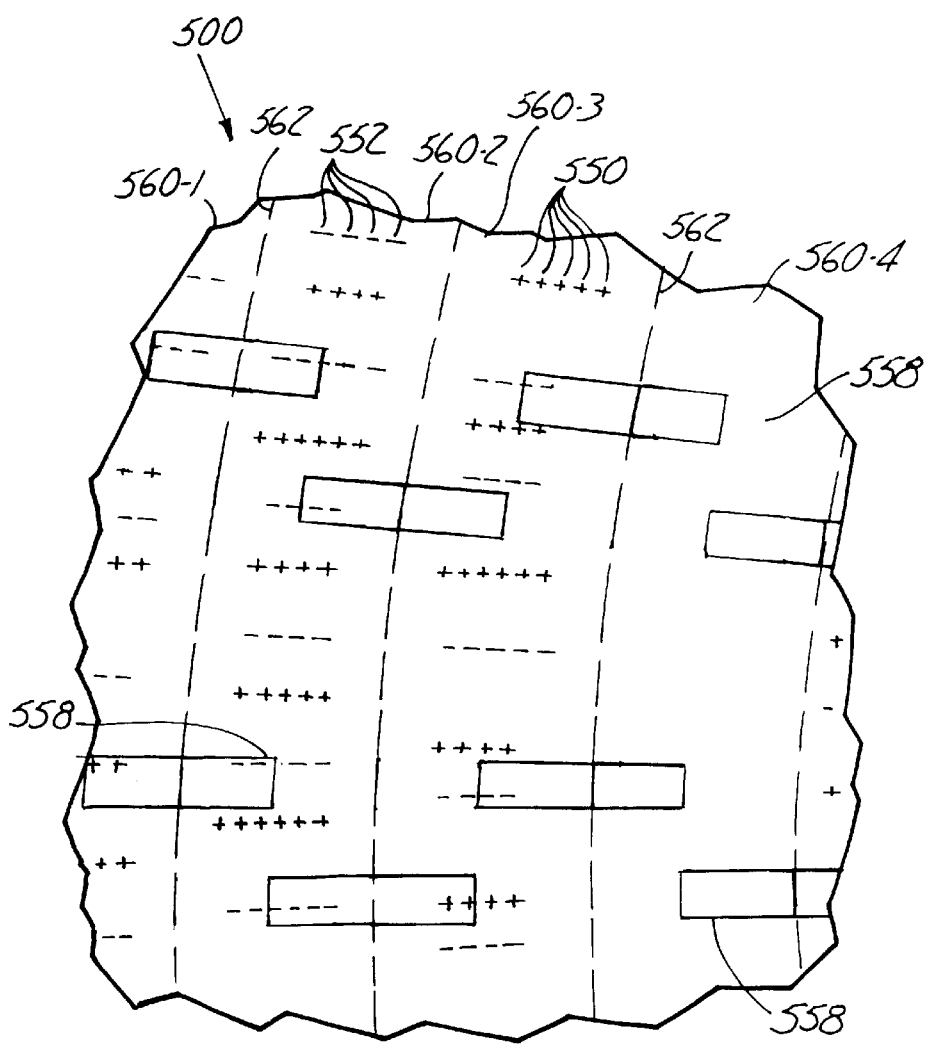
FIG. 5 is a greatly enlarged top plan view of a portion of a thin film magnetic disc, in accordance with the invention, diagrammatically showing magnetic flux corresponding to data and servo information stored on the magnetic disc.

The servo pattern illustrated diagrammatically in FIG. 2 is shown in greater detail and with more precision in FIG. 4. The illustrative prior art servo pattern shown in FIG. 4 includes bursts 302 and 304 disposed on opposite sides of the servo tracks (tracks 310, 312, 314, 316, 318 and 320 shown). A direction of disc motion is represented by arrow 322. When a transducer is directly centered the position error signal will have equal components from bursts 302 and 304. Since bursts 302 and 304 are of equal amplitude, a position error signal of zero is indicative of the transducer disposed directly above the track centerline. In order to facilitate control, bursts 306 and 308 can be provided to create a signal that is 90° out of phase in the radial direction (also known as a quadrature pattern) with the 302–304 burst signal. The servo pattern shown in FIG. 4 is exemplary only, and a variety of other methods can be used. For example, the servo patterns taught in U.S. patent application Ser. No. 09/425,768 filed Oct. 22, 1999 and entitled, "METHOD AND APPARATUS FOR THERMALLY WRITING SERVO PATTERNS ON MAGNETIC MEDIA" can also be used. Additionally, if the position reference information allows effective interpolation, the radial intervals between the position reference information need not correspond to each track of the disc. For example, the position reference information can be written at a radial interval of two data tracks, or at sub-data track intervals.

Referring back to prior art FIGS. 2 and 3, during use of a disc drive utilizing prior art magnetic medium 200, data is magnetically written on magnetic data layer 244 in data portions 257 of tracks 260. As shown by magnetization signs 250, 252, data is recorded on tracks 260 by oppositely magnetizing locations within tracks 260. Data is then read from magnetic medium 200 by sensing the alternating direction of magnetic flux. No data has yet been written on track 2604, and hence track 2604 is depicted without +and − magnetization signs 250, 252.

In addition to exhibiting the in situ servo information writing limitations discussed above, servo patterns 256 written in traditional servo portions of the data tracks results in the consumption of a considerable portion of the useable recording area of the disc drive.

Figures 1, 6:
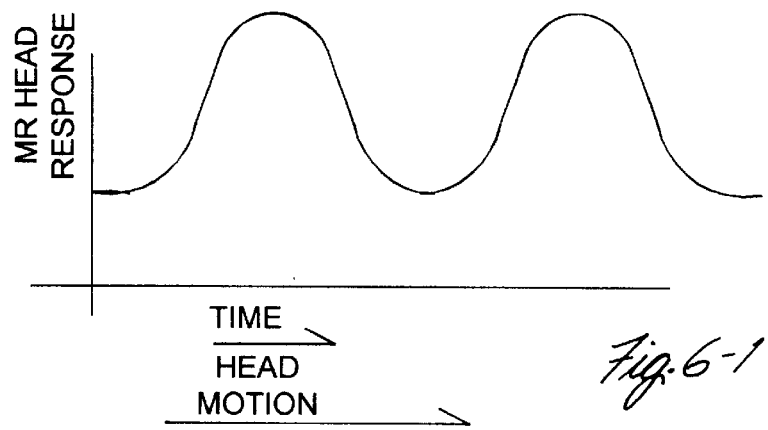
Figures 2, 6:
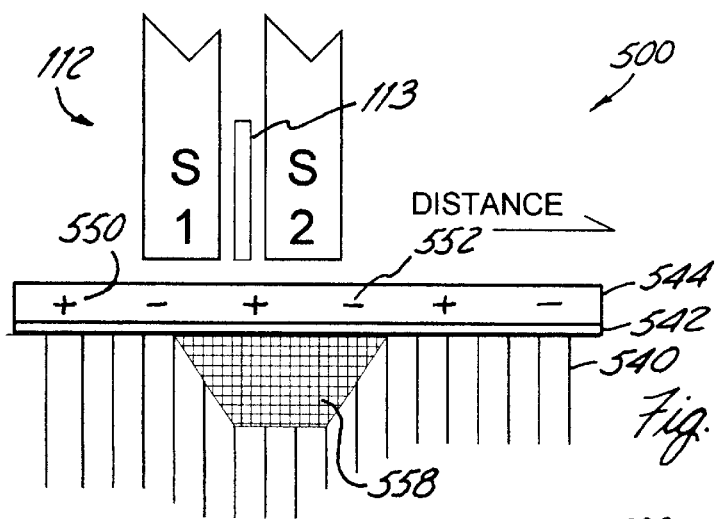
Figures 3, 6:
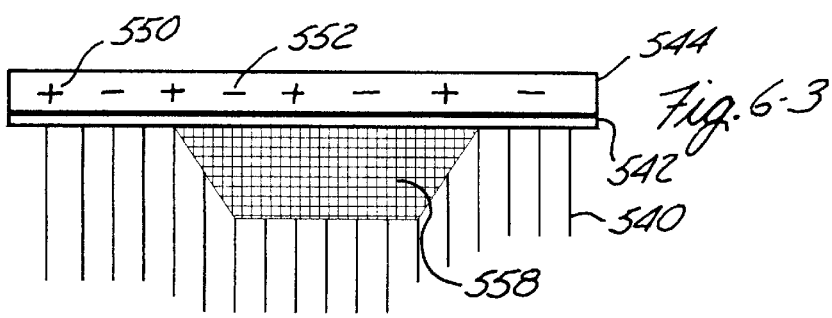

In accordance with the present invention, servo information can be patterned into the substrate of the disc, or into a servo information layer separate from the magnetic data layer, directly under data stored in data portions of the magnetic data layers. FIGS. 5 and 6–1 through 6–3 illustrate one such embodiment of magnetic medium 500 for a disc 107 of disc drive 100. FIGS. 6–2 and 6–3 illustrate portions of medium 500 at inner diameter (ID) and out diameter (OD) regions of the disc, respectively. FIG. 6–1 is a plot illustrating a servo signal which can be continuously provided by a magnetoresistive data head 112 in response to the hard patterned servo information. The sinusoidal signal, as will be discussed later, is partially due to spacing loss. The embodiment illustrated in FIGS. 5 and 6–1 through 6–3 is intended to be diagrammatic. As will be discussed below in greater detail, layers in addition to those illustrated in FIG. 6 can be utilized. Further, as discussed above with reference to prior art FIGS. 2–4, one of skill in the art will recognize that any suitable conventional servo pattern or adaptation thereof can be utilized in the invention.

Magnetic medium 500 has a servo information layer 540 having servo information 558 formed or patterned therein. In embodiments of the invention, servo information layer 540 is a substrate of the disc. In the alternative, servo information layer 540 in which servo information 558 is patterned can be a servo layer which is separate from the disc substrate. In either case, servo information layer 540 is separate from magnetic data layer 544. Spacer layer 542 is formed between magnetic data layer 544 and servo information layer 540. After construction, magnetic medium 500 has data magnetically recorded on magnetic data layer 544, as represented in FIGS. 5 and 6–1 through 6–3 by + and − magnetization signs 550, 552, respectively, on data tracks 560-1, 560-2, 560-3, 560-4. Data tracks 560 are separated by track boundaries 562.

Servo information 558 can be formed in servo information layer 540 in the form of pits, grooves or other types of servo data marks (hereinafter "servo pits") formed from the deposited magnetic material. As can be seen in FIGS. 5 and 6–1 through 6–3, servo information 558 (diagrammatically represented in FIG. 5 as rectangles), which is hard patterned or formed in servo information layer 540 in the form of servo pits, is positioned directly underneath data which is magnetically recorded on magnetic data layer 544. Thus, if desired, regions of the disc which have conventionally been reserved for servo patterns 256 (see FIG. 2) can be used for data storage. In addition to eliminating or reducing the loss of disc space associated with the servo patterns of prior art discs, placing servo information 558 directly underneath regions where data will be stored on magnetic data layer 544 allows head 112 to provide a more frequently or continuously available servo signal for use in control of the disc drive. Data is written in a magnetic data layer 544 that is totally switched, and the servo information is formed in a buried layer 540 that is also totally switched. The data and servo layers can be separated by a spacer layer 542. Note that partial penetration recording is not used, so there is no compromise in the data layer recording.

A fully resolved bit density of approximately 1,000 servo pits per mm can be embossed or etched on plastic, aluminum or glass discs. One etching method utilizes holographic projection printing. The servo pits in the disc are filled with recordable magnetic material like CoCr which has anisotropic magnetization perpendicular to the disc surface. Material can be mechanically soft to allow for chemical mechanical polishing. This particular data density corresponds to a 20 MHz servo signal on the inner diameter (ID) track of a 10,000 rotation-per-minute (RPM) 3.5 inch disc.

Figure 8:
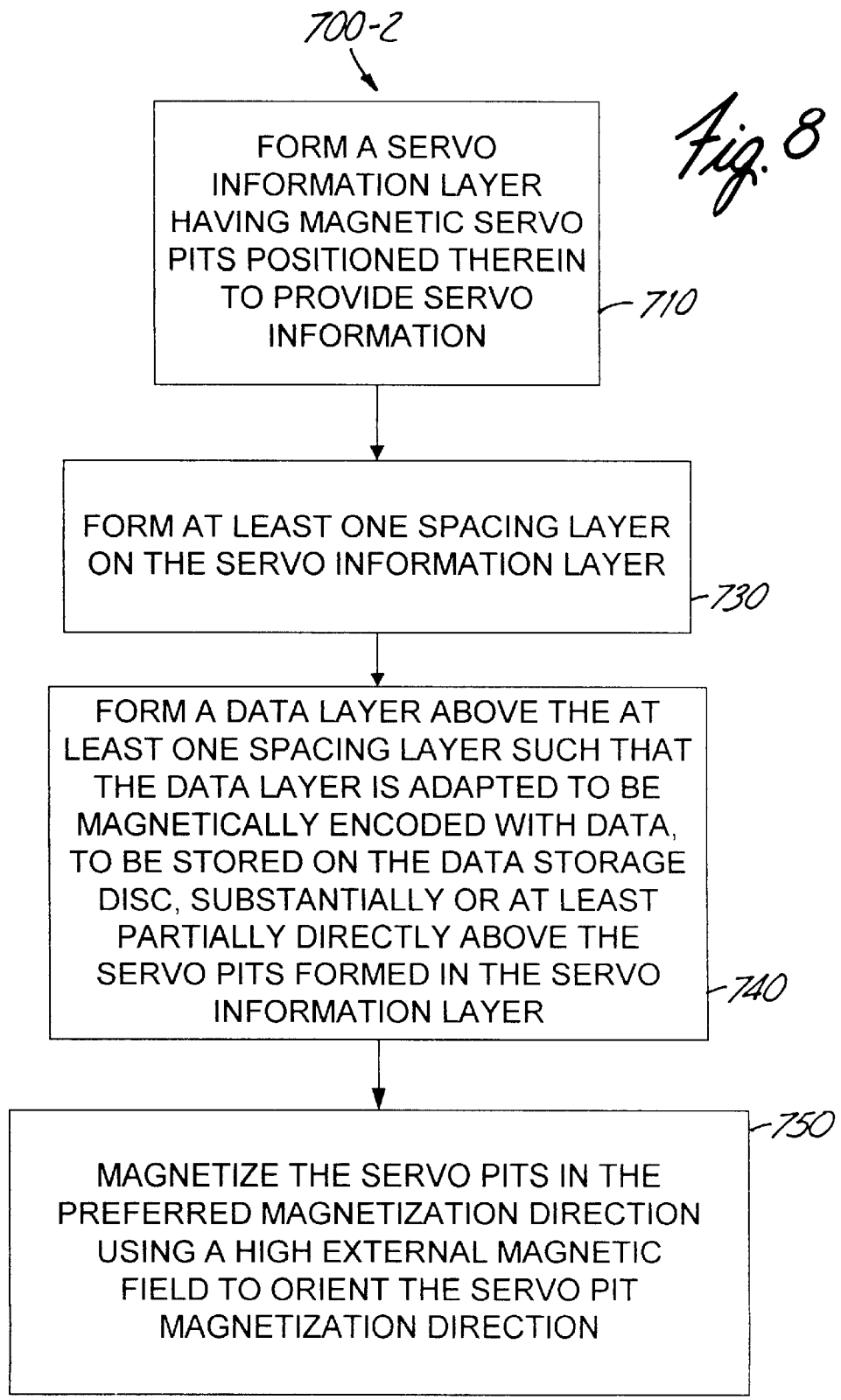
Figure 9:
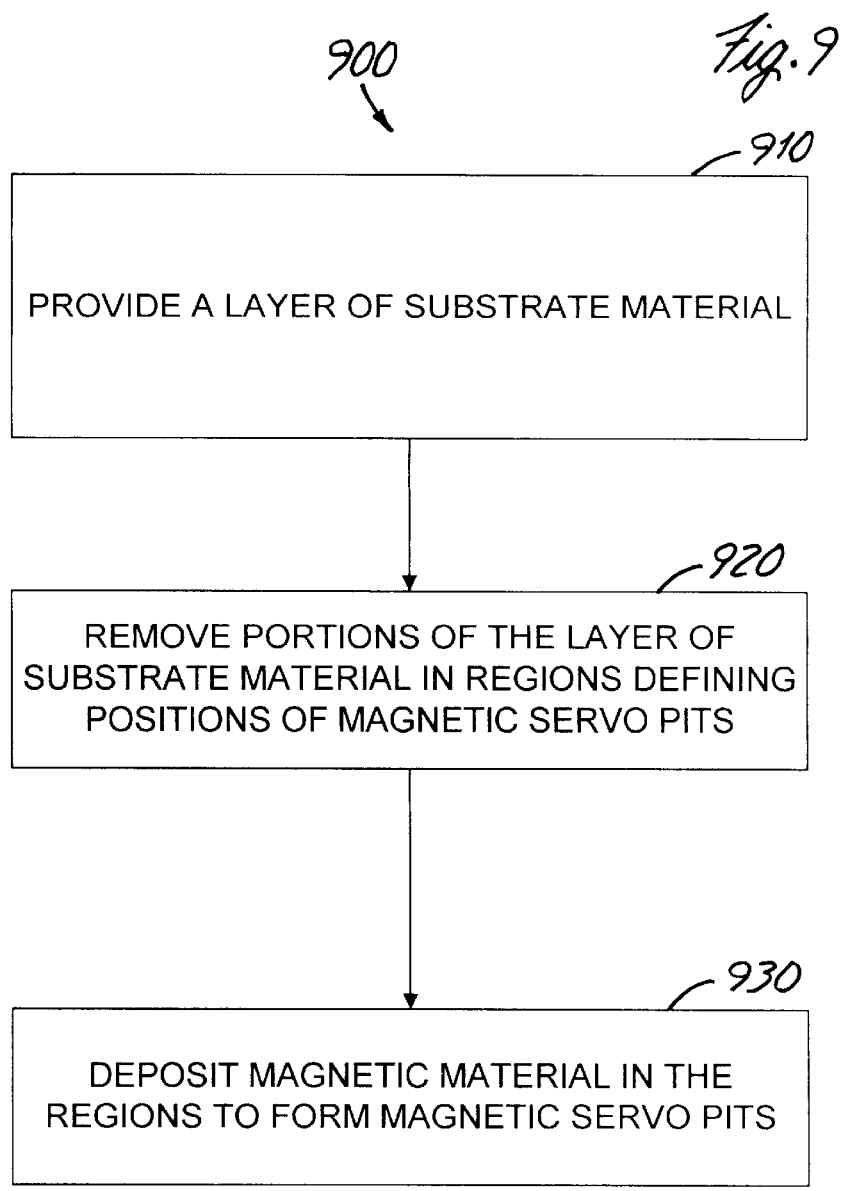
Figure 10:
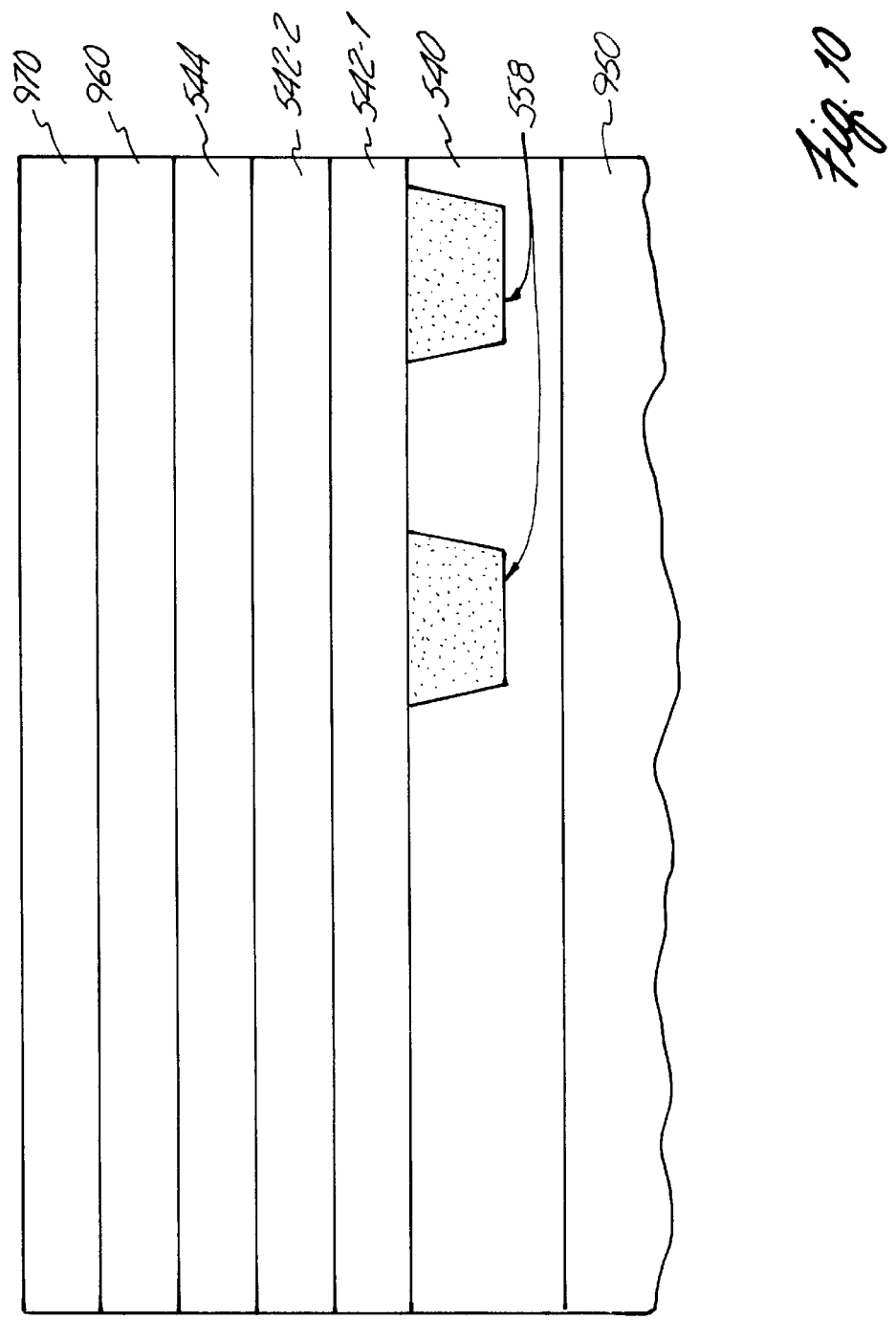
FIG. 10 is a diagrammatic sectional view of a portion of a thin film magnetic disc in accordance with an embodiment of the present invention.

FIGS. 7–9 are flow diagrams illustrating embodiments of a method of the present invention of fabricating magnetic data storage discs. FIG. 10 is a diagrammatic sectional view illustrating a portion of a data storage disc manufactured using the method of the invention.

As illustrated at the step of block 710 in the flow diagrams 700-1 and 700-2 of FIGS. 7 and 8, a servo information layer 540 is formed. The servo information layer 540 has servo pits 558 formed therein. As illustrated at the step of block 720, a magnetic data layer 544 is formed on top of the servo information layer 540 such that the data layer is adapted to be magnetically encoded with data, to be stored on the data storage disc, substantially directly on top of the servo pits formed in the servo information layer. As illustrated in the step of block 750 of FIGS. 7 and 8, the servo pits are magnetized using a high external magnetic field to orient the servo pit magnetization in a desired direction. The desired magnetization direction can be selected as a design choice in accordance with various embodiments of the invention. The invention therefore includes all magnetization directions of the servo pits.

As illustrated in the steps of blocks 730 and 740 of FIG. 8, in some embodiments, a spacing layer or layers 542 is formed on top of the servo information layer. For example, as shown in FIG. 10, a layer 542-1 of NiAl having a thickness of between about 500 Å and about 600 Å and a layer 542-2 of CrMo having a thickness of about 200 A can be used to form spacing layer 542. Note that these layers are part of standard media film stacks. When one or more spacing layers is used, the magnetic data layer 544 is formed on top of the spacing layer(s).

As discussed above, servo information layer 540 can be a substrate of the magnetic disc, or can be a separate layer formed on top of a substrate 950 such as an aluminum substrate. In one embodiment, servo information layer 540 is a layer of NiP having CoCr magnetic material forming the servo pits. An exemplary thickness of the NiP servo information layer is 450 pin. If desired, a carbon overcoat layer 960 and a lubricant layer 970 can be formed on top of the magnetic data layer 544. An example of a suitable thickness for the carbon overcoat layer 960 is between about 50 Å and about 75 Å. The present invention is not limited by the exemplary layer thicknesses discussed.

FIG. 9 shows one more particular method 900 of performing step 710 of forming or placing the servo pits 558 in a servo information layer. A first step illustrated at block 910 in FIG. 9 is to provide a layer of substrate material. As illustrated at block 920, the step of removing portions of the layer of substrate material in regions defining positions of the magnetic servo pits 558 is next performed. Then, as illustrated at the step of block 930, a magnetic material is deposited into the removed regions to form the magnetic servo pits.

As discussed, the servo information pits can be formed in an aluminum substrate media. However, as also discussed above, it may be necessary to etch the pits into the NiP (or other material) plated layer on the disc substrate to reduce the spacing loss (discussed below with reference to FIG. 11) to acceptable levels. Therefore, in one embodiment, the NiP plated substrate will be etched to remove material where the servo pits are to be formed, then filled with a magnetic material such as CoCr. A Chemical Mechanical Polishing (CMP) step can then be performed to smooth the surface, and then the remaining layers are sputtered or deposited. On glass substrates, the NiP layer is not necessary, so the etching process will be done directly on the glass.

The same MR or GMR data head 112 will be used to read both the data and servo information. Neither separate heads nor azimuth recording is used. Note that the buried pattern can be written so that it has a constant frequency independent of radius.

The signals from the data and buried servo layers can be made orthogonal by two methods:

1) Frequency separation. For example, the data written to data layer 544 by head 112 can be sensed in the frequency band above 10 MHz and the servo frequencies can be sensed in the frequency band below 10 MHz. It must be understood that 10 MHz is provided as an example only, and that the actual frequency band will be product specific.

2) Spacing loss: Selectively reduces the amplitude of the high frequency information in the buried layer servo layer. The spacing loss is proportional to the wavelength of the servo pattern that will increase with radius because of the constant data frequency. In one embodiment, one can ideally attempt to make the spacing thickness proportional to radius for constant spacing loss for each frequency harmonic component.

FIG. 11 shows mathematically the effects of spacing loss for the ID of a typical 3.5 inch disc. The signal period of 10 $\mu$m corresponds to a 2 MHz buried servo square wave tone if the media velocity is 20 m/sec. The spacing layer of 2.5 $\mu$m at the ID was chosen so that the servo signal is about 20% of the data signal in order to minimize inter-modulation distortion in the MR head. The $3^{rd}$ harmonic is down by −40 dB and should not interfere with the data signal. It is assumed that the data signal has all of its power spectra above 4 MHz so that it is not affected by the 2 MHz servo signal.

FIG. 11 also shows the harmonic content of a square wave and how the spacing loss limits the high frequency content of the buried read back tone signal. The square wave is representative of what the signal would look like with no spacing loss. The actual signal is attenuated with minimal high harmonic components. The small servo signal amplitude and uncertainties about the signal amplitude suggests that the position sensing system should use relative phase of sinusoidal servo bursts to encode the radial position information. However, the present invention can include the use of other types of patterns.

The buried servo information can in some embodiments consist of 2 parts:

1) Circumferential position encoding: the servo clock signal with index mark.
2) Radial position encoding: a tone pattern whose phase varies with radius by some radial distance modulus.

Circumferential Position Encoding

First consider the circumferential position encoding alone. This encoding may be valuable by itself to eliminate the clock head in a pusher type servo writer or to assist in self servo writing. The encoding can be as simple as a continuous 50%–50% square wave tone such that there is an integral number of marks (tone cycles) per revolution. The index mark would be encoded as a missing mark (missing tone cycle) where the index mark is to be.

Radial Position Encoding

The radial position encoding is a variation of the circumferential encoding in which the tone is divided into an even number of groups of marks around the disc. For example the 3.5 inch disc could have 1280 marks per revolution at the 10 $\mu$m spacing at the ID. These marks could be grouped into 128 groups of 10 marks each. The index position could be indicated by a group with no marks in it, for example. The odd numbered groups would have the constant reference tone marks in it. The even numbered groups except 0 would have phase shifted tones whose phase would shift with radius. These phase shifted marks would be sections of a spiral.

In review of the invention as described above with reference to the drawings, a disc drive data storage system 100 is disclosed. The disc drive data storage system includes a data head 112 adapted to sense magnetic fields and a data storage disc 107 positioned such that the data head senses magnetic fields from the data storage disc for reading both magnetically stored data 550, 552 and servo information 558. The data storage disc includes a data layer 544 adapted to be magnetically encoded with data 550, 552 to be written to the data storage disc by the data head 112. The data storage disc also includes a servo information layer 540 formed beneath the data layer 544 and having magnetic servo pits 558 formed therein to provide servo information. The magnetic servo pits 558 are positioned in portions of the servo information layer 540 which are substantially directly beneath magnetically encoded data 550, 552 stored on the data layer 544 such that the data head 112 reads both magnetically stored data and servo information at substantially the same time.

In some embodiments of the invention, the data layer 544 is adapted to be magnetically encoded with data 550, 552 around substantially the entire circumference of the data storage disc 107. In some embodiments of the invention, the magnetic servo pits 558 are spaced apart within the servo information layer 540 such that the data head 112 is provided substantially continuous access to servo information allowing the data head to provide as an output a substantially continuous servo signal (FIG. 6–1). The servo information layer 540 can in some embodiments be a substrate of the data storage disc. In other embodiments, the servo information layer is a layer formed on the substrate of the data storage disc. In some embodiments of the invention, the disc 107 includes at least one spacing layer 542 formed between the servo information layer 540 and the data layer 544. As discussed above, the normal film layers in standard media film stacks can serve as the spacer layer.

If desired, the servo pits 558 can be spaced apart such that, for a given rate of disc rotation, the servo information is provided to the data head 112 at a substantially constant frequency independent of radius. The servo pits 558 can also be spaced apart such that, for a desired rate of disc rotation, the servo information is provided to the data head at a frequency of less than about 10 MHz (used as an example), while the magnetically encoded data 550, 552 in the data layer 544 is provided to the data head 112 at a frequency of greater than about 10 MHz.

In some embodiments, the servo information layer 540 further includes a layer of substrate material having etched regions defining positions of the magnetic servo pits 558 and magnetic material formed in the etched regions of the layer of substrate material to form the magnetic servo pits.

Also disclosed is a method 700-1, 700-2 of manufacturing a magnetic data storage disc 107. The method includes step 710 of forming a servo information layer 540 having magnetic servo pits 558 positioned therein to provide servo information. The method also includes step 720 of forming a data layer 544 on top of the servo information layer 540 such that the data layer is adapted to be magnetically encoded with data 550, 552, to be stored on the data storage disc 107, substantially directly on top of the servo pits 558 formed in the servo information layer 540. Step 720 can further include forming the data layer 544 such that it is adapted to be magnetically encoded with data 550, 552 around substantially the entire circumference of the data storage disc 107.

Step 710 can further include forming the servo information layer 540 such that the magnetic servo pits 558 are spaced apart within the servo information layer such that, for a given rate of disc rotation, servo information is provided at a substantially constant frequency independent of radius. The magnetic servo pits 558 can also be spaced apart within the servo information layer 540 such that, for a desired rate of disc rotation, servo information is provided at a frequency of less than about 10 MHz, while the magnetically encoded data 550, 552 in the data layer 544 is provided at a frequency of greater than about 10 MHz.

In some embodiments, step 710 also includes forming the servo information layer 540 such that the magnetic servo pits 558 provide servo information around substantially the entire circumference of the data storage disc. The method of the invention can also include step 730 of forming at least one spacing layer 542 on the servo information layer 540 such that the at least one spacing layer is formed between the data layer 544 and the servo information layer. In these embodiments, step 720 is replaced with step 740 of forming the data layer on top of the spacing layer 542.

In some embodiments, step 710 includes forming the servo pits 558 in a substrate of the data storage disc 107. Step 710 can also include step 910 of providing a layer of substrate material, step 920 of removing portions of the layer of substrate material in regions defining positions of the magnetic servo pits 558, and step 930 of depositing magnetic material in the regions to form the magnetic servo pits. Step 920 of removing portions of the layer of substrate material can include etching the layer of substrate material to remove the portions, while step 930 includes depositing CoCr in the regions to form the magnetic servo pits 558. The method can also include chemical mechanical polishing the layer of substrate material and magnetic servo pits to provide a smooth surface.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, references herein to the magnetic servo pits being positioned substantially or partially directly beneath or under magnetically encoded data, as well as references to the magnetically encoded data being above the magnetic servo pits, are intended to represent a partial alignment of some data and some servo pits along axis which are perpendicular to the planes of the discs in which the various layers are formed.

What is claimed is:

1. A disc drive data storage system comprising:
    a data head adapted to sense magnetic fields;
    a data storage disc positioned such that the data head senses magnetic fields from the data storage disc for reading both magnetically stored data and servo information, the data storage disc comprising:
        a data layer adapted to be magnetically encoded with data to be written to the data storage disc by the data head; and
        a servo information layer formed beneath the data layer and having magnetic serve pits formed therein to provide servo information, the magnetic servo pits being positioned in portions of the servo information layer which are at least partially directly beneath magnetically encoded data stored on the data layer such that the data head reads both magnetically stored data and servo information at, substantially the same time.

2. The disc drive data storage system of claim 1, wherein the data layer is adapted to be magnetically encoded with data around substantially the entire circumference of the data storage disc.

3. The disc drive data storage system of claim 2, wherein the magnetic servo pits are spaced apart within the servo information layer such that the data head is provided substantially continuous access to servo information allowing the data head to provide as an output a substantially continuous servo signal.

4. The disc drive data storage system of claim 3, wherein the servo information layer comprises a substrate of the data storage disc.

5. The disc drive data storage system of claim 3, wherein the servo information layer is a layer formed on the substrate of the data storage disc.

6. The disc drive data storage system of claim 3, and further comprising at least one spacing layer formed between the servo information layer and the data layer.

7. The disc drive data storage system of claim 3, wherein the servo pits are spaced apart such that, for a given rate of disc rotation, the servo information is provided to the data head at a substantially constant frequency independent of radius.

8. The disc drive data storage system or claim 7, wherein the servo pits are spaced apart such that, for a desired rate of disc rotation, the servo information is provided to the data head at a frequency of less than a first frequency, while the magnetically encoded data in the data layer is provided to the data head at a frequency of greater than the first frequency.

9. The disc drive data storage system of claim 3, wherein the servo information layer further comprises:
  a layer of substrate material having etched regions defining positions of the magnetic servo pits; and
  magnetic material formed in the etched regions of the layer of substrate material to form the magnetic servo pits.

10. A method of manufacturing a magnetic data storage disc, the method comprising steps of:
  (a) forming a servo information layer having magnetic servo pits positioned therein to provide servo information; and
  (b) forming a data layer on top of the servo information layer such that the data layer is adapted to be magnetically encoded with data, to be stored oil the data storage disc, at least partially directly on top of the servo pits formed in the servo information layer.

11. The method of claim 10, wherein step (b) further comprises forming the data layer such that it is adapted to be magnetically encoded with data around substantially the entire circumference of the data storage disc.

12. The method of claim 11, wherein step (a) further comprises forming the servo information layer such that the magnetic servo pits are spaced apart within the servo information layer such that, for a given rate of disc rotation, servo information is provided at a substantially constant frequency independent of radius.

13. The method of claim 12, wherein step (a) further comprises forming the servo information layer such that the magnetic servo pits are spaced apart within the servo information layer such that, for a desired rate of disc rotation, servo information is provided at a frequency of less than a first frequency, and wherein the magnetically encoded data in the data layer is provided at a frequency of greater than the first frequency.

14. The method of claim 11, wherein step (a) further comprises forming the servo information layer such that the magnetic servo pits provide servo information around substantially the entire circumference of the data storage disc.

15. The method of claim 14, and further comprising step (c) of forming at least one spacing layer on the servo information layer such that the at least one spacing layer is formed between the data layer and the servo information layer.

16. The method of claim 11, wherein step (a) further comprises forming the servo pits in a substrate of the data storage disc.

17. The method of claim 11, wherein step (a) further comprises steps of:
  (a)(1) providing a layer of substrate material;
  (a)(2) removing portions of the layer of substrate material in regions defining positions of the magnetic servo pits; and
  (a)(3) depositing magnetic material in the regions to form the magnetic servo pits.

18. The method of claim 17, wherein step (a)(2) further comprises etching the layer of substrate material to remove the portions, and wherein step (a)(2) further comprises depositing CoCr in the regions to for m the magnetic servo pits.

19. The method of claim 18, and further comprising step (a)(4) of chemical mechanical polishing the layer of substrate material and magnetic servo pits to provide a smooth surface.

20. A data storage system comprising:
  data storage disc means for storing magnetically encoded data and servo information wherein the servo information is at least partially directly beneath the magnetically encoded data; and
  data head means' for reading the magnetically encoded data and servo information from the data storage disc means at substantially the same time.

* * * * *

UNITED STATES PATENT AND TRADEMARK OFFICE
CERTIFICATE OF CORRECTION

PATENT NO. : 6,614,608 B1
DATED : September 2, 2003
INVENTOR(S) : Karl A. Belser et al.

It is certified that error appears in the above-identified patent and that said Letters Patent is hereby corrected as shown below:

<u>Column 11,</u>
Line 6, delete "," after the word "at".
Line 53, delete "oil" and insert -- on --.

<u>Column 12,</u>
Line 42, delete "for m" and insert -- form --.
Line 53, delete "means" and insert -- means --.
Line 54, delete extra indent.

Signed and Sealed this

Seventeenth Day of February, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,614,608 B1
DATED : September 2, 2003
INVENTOR(S) : Karl A. Belser et al.

It is certified that error appears in the above-identified patent and that said Letters Patent is hereby corrected as shown below:

<u>Column 11,</u>
Line 6, delete "," after the word "at".
Line 53, delete "oil" and insert -- on --.

<u>Column 12,</u>
Line 42, delete "for m" and insert -- form --.
Line 54, delete "means'" and insert -- means --.
Line 54, delete extra indent.

This certificate supersedes Certificate of Correction issued February 17, 2004.

Signed and Sealed this

Sixth Day of April, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,614,608 B1
DATED : September 2, 2003
INVENTOR(S) : Karl A. Belser et al.

It is certified that error appears in the above-identified patent and that said Letters Patent is hereby corrected as shown below:

Column 10,
Line 67, replace "serve" with -- servo --.

Signed and Sealed this

Fifth Day of October, 2004

JON W. DUDAS
*Director of the United States Patent and Trademark Office*